(12) United States Patent
Huang et al.

(10) Patent No.: US 10,275,373 B2
(45) Date of Patent: Apr. 30, 2019

(54) HOT SWAPPABLE DEVICE AND METHOD

(71) Applicant: Huawei Technologies Co., Ltd., Shenzhen, Guangdong (CN)

(72) Inventors: Rui Huang, Chengdu (CN); Zhi Zhang, Chengdu (CN); Guanfeng Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 15/422,779

(22) Filed: Feb. 2, 2017

(65) Prior Publication Data
US 2017/0228330 A1    Aug. 10, 2017

(30) Foreign Application Priority Data

Feb. 4, 2016    (CN) .......................... 2016 1 0079308

(51) Int. Cl.
*G06F 13/24* (2006.01)
*G06F 13/40* (2006.01)
*G06F 13/42* (2006.01)

(52) U.S. Cl.
CPC .......... *G06F 13/24* (2013.01); *G06F 13/4081* (2013.01); *G06F 13/4282* (2013.01)

(58) Field of Classification Search
None
See application file for complete search history.

(56) References Cited

U.S. PATENT DOCUMENTS

| 7,660,937 | B2* | 2/2010 | Frantz | G06F 13/107 710/311 |
| 7,996,749 | B2* | 8/2011 | Ding | H04L 25/45 327/231 |
| 8,238,255 | B2* | 8/2012 | Suresh | G06F 11/0712 370/216 |

(Continued)

FOREIGN PATENT DOCUMENTS

CN    101739379 B    10/2014

OTHER PUBLICATIONS

PCI Special Interest Group, "PCI Standard Hot-Plug Controller and Subsystem Specification", PCI Local Bus, Jun. 20, 2001, 196 pages.

(Continued)

*Primary Examiner* — Elias Mamo

(57) ABSTRACT

A hot swappable device includes a port, a firmware module, and an interrupt masking module. The port includes a Peripheral Component Interface express Physical Layer, and the Peripheral Component Interface express Physical Layer includes multiple lanes lanes. The Peripheral Component Interface express Physical Layer detects an analog signal in each of the multiple lanes, when it is detected that an amplitude of an analog signal in one of the multiple lanes is less than a preset threshold, generates an ALOS signal corresponding to the lane, and transmits the ALOS signal to the interrupt masking module. The interrupt masking module generates an ALOS interrupt signal corresponding to the lane and sends the ALOS interrupt signal to the firmware module. If the firmware module receives, in a preset time period, an ALOS interrupt signal corresponding to each lane, the firmware module resets the port.

15 Claims, 6 Drawing Sheets

(56) References Cited

U.S. PATENT DOCUMENTS

| | | | | |
|---|---|---|---|---|
| 8,791,691 | B2* | 7/2014 | Cheng | H04L 25/062 |
| | | | | 324/140 R |
| 9,213,667 | B2* | 12/2015 | Cranford, Jr. | G06F 13/423 |
| 9,792,171 | B2* | 10/2017 | Arroyo | G06F 11/0793 |
| 2007/0214301 | A1* | 9/2007 | Chen | G06F 13/4081 |
| | | | | 710/301 |
| 2012/0072633 | A1 | 3/2012 | Elboim | |
| 2015/0355686 | A1* | 12/2015 | Heyd | G06F 1/187 |
| | | | | 361/679.31 |

OTHER PUBLICATIONS

PCI Express, "PCI Express Base Specification Revision 3.0", Nov. 10, 2010, 860 pages.

\* cited by examiner

<Prior Art>

HOT SWAPPABLE DEVICE AND METHOD

CROSS-REFERENCE TO RELATED APPLICATION

This application claims priority to Chinese Patent Application No. 201610079308.9, filed on Feb. 4, 2016, which is hereby incorporated by reference in its entirety.

TECHNICAL FIELD

The present invention relates to the communications field, and in particular, to a hot swappable device and method.

BACKGROUND

In the field of information communications technologies, a hot swapping technology is widely used. By using the hot swapping technology, a fault can be maintained and replaced without interrupting a service of a server or other IT devices, thereby improving maintainability of a device and robustness of a system. In the prior art, refer to a schematic diagram of a system 10 of a hot swappable device shown in FIG. 1. The hot swappable system 10 includes a host 11 and a hot swappable device 12. The hot swappable device 12 includes a port 121, a system control register 122, a firmware module 123, a notification button 126, and a power indicator 127. The port 121 includes a Peripheral Component Interface express Physical Layer 124 and a controller 125. The external host 11 establishes a communications link with the hot swappable device by using the port 121. The Peripheral Component Interface express Physical Layer 124 receives an instruction sent by the host 11. The Peripheral Component Interface express Physical Layer 124 and the controller 125 execute a related service according to the instruction transmitted by the host 11. A process in the prior art in which a port performs a hot removal operation is described below with reference to FIG. 1.

1. A user presses the notification button 126 to trigger a hot removal request. After receiving the hot removal request, the system control register 122 transmits the hot removal request to the firmware module 123. After receiving the hot removal request, the firmware module 123 sends an interrupt request to the host 11. The host 11 presents again an interrupt acknowledgment to the user according to the interrupt request, and after the host 11 obtains an acknowledgment from the user, the host 11 sends an interrupt response to the firmware module.

2. After receiving the interrupt response, the firmware module 123 detects that the host 11 does not send data any longer, determines that a current service is completed, and prohibits use of a slot of the port.

3. The power indicator 127 indicates that the user can perform the hot removal operation.

The foregoing steps briefly describe operation steps of hot removing the port 121 from the host 11. Subsequently, if the port 121 needs to be re-inserted into the host to perform a hot insertion step, the notification button 126 is also required to trigger a hot insertion request. The user can perform a hot insertion operation only after the power indicator 127 indicates that the user can perform the hot insertion operation. Specific steps are similar to the foregoing steps, and details are not described herein again by using an example.

It can be learned from the foregoing example that when the user performs a hot insertion and hot removal operation, the hot swappable device needs to be notified in advance, so that after the hot swappable device is well-prepared, the hot swappable device notifies, by using an indicator, the user that the hot insertion and hot removal operation can be performed. The user is not allowed to perform an insertion and removal action on the hot swappable device without notifying the hot swappable device. The user needs to wait for an indication before performing the operation. The operation is complex and a waiting time is long. In addition, the hot insertion and hot removal operation needs to be supported by auxiliary hardware such as the notification button and the power indicator, and the foregoing auxiliary hardware extremely wastes resources on a plate electrode.

SUMMARY

Embodiments of the present invention provide a hot swappable device and method, so that redundant auxiliary hardware on a plate electrode can be reduced, hardware resources on the plate electrode can be reduced, hot insertion and hot removal can be performed, a waiting time is not required, and insertion and removal efficiency can be improved.

The hot swappable device provided by the present invention is applied to a hot swappable system. The hot swappable system includes a host and the hot swappable device. The hot swappable device includes multiple ports, and the hot swappable device may establish a communications link with multiple different hosts by using the multiple ports, so as to implement sharing of resources in the hot swappable device. The hot swappable device in the embodiments of the present invention may be any other device that can support a hot swapping function. The hot swappable device may be a solid state drive (English: Solid State Drive, SSD for short), or may be an accelerator card.

A first aspect of the present invention provides a hot swappable device, where the device includes a port, a firmware module, and an interrupt masking module, the device is connected to a host by using the port, the port includes a Peripheral Component Interface express Physical Layer, the Peripheral Component Interface express Physical Layer includes multiple lanes lanes, and the multiple lanes are configured to receive an analog signal from the host.

After the device is powered on completely, the firmware module queries for a rate value of a current link that is recorded in a link rate register of a controller. When the firmware module determines that a highest rate value of the current link reaches a preset threshold, it indicates that a communications link established by the hot swappable device with the host reaches a stable state, and then the Peripheral Component Interface express Physical Layer starts to detect an analog signal of the Peripheral Component Interface express Physical Layer. The Peripheral Component Interface express Physical Layer detects an analog signal in each of the multiple lanes, and when it is detected that an amplitude of an analog signal in one of the multiple lanes is less than a preset threshold, the Peripheral Component Interface express Physical Layer generates an analog signal loss indication ALOS signal corresponding to the lane. The Peripheral Component Interface express Physical Layer transmits the ALOS signal to the interrupt masking module, the interrupt masking module generates an ALOS interrupt signal corresponding to the lane, and the interrupt masking module sends the ALOS interrupt signal to the firmware module. From a time when the firmware module receives an ALOS interrupt signal corresponding to the first lane, if the firmware module receives, in a preset time period, an ALOS interrupt signal corresponding to each lane, the firmware module resets the port. Actually, the ALOS interrupt signal is used to indicate a hot removal event.

In an embodiment, when the firmware module determines that ALOS interrupt signals of all lanes corresponding to the port are received, the firmware module determines that the port is executing a hot removal event, and the firmware module performs hot removal event interrupt processing. Detection of the hot removal event is implemented without a need of using auxiliary hardware such as a notification button, thereby effectively reducing hardware resources on a plate electrode.

Optionally, the device further includes a system control register, the port further includes a controller, the Peripheral Component Interface express Physical Layer is connected to the controller, the controller is connected to the system control register, and the system control register is connected to the firmware module. That the firmware module resets the port includes: the firmware module configures a warm reset signal by using the system control register, and the controller and the Peripheral Component Interface express Physical Layer reset according to the warm reset signal.

Optionally, after the controller and the Peripheral Component Interface express Physical Layer reset, to ensure that residual data of a service does not affect subsequent normal proceeding of the service, the residual data related to the service in the register of the controller needs to continue to be cleared. The ALOS interrupt signal corresponding to each lane and received by the firmware module in the preset time period is used to instruct to hot remove the port from the host. The firmware module configures a clear flag for the port by using the system control register, and the controller clears, according to the clear flag, the residual data of the service that is executed when the port is hot removed from the host.

Optionally, the port further includes a counter, the controller clears the residual data of the service according to the clear flag, and the counter is configured to record a remaining quantity of the residual data of the service when the controller performs a clear operation. When a count of the counter is zero, the firmware module configures a clear cancellation flag by using the system control register, and the controller stops, according to the clear cancellation flag, performing the operation of clearing the data of the service.

In an embodiment, the firmware module configures a clear flag for the controller by using the system control register, so that the controller clears residual data of a service, and the firmware module may determine, according to the counter, that the residual data of the service of the port is cleared completely, so as to prevent that invalid residual data of the service may be still returned after a link is reestablished by using the port, affecting subsequent normal proceeding of the service.

Optionally, after the port completes hot removal, the hot swappable device may be re-inserted into the host or another host to establish a communications link with the host. The port also involves a hot insertion operation. Detection of hot insertion is implemented by the firmware module by detecting a level transition of a hardware reset signal input by the host. Specifically, the interrupt masking module receives the hardware reset signal output by the host and sends the hardware reset signal to the firmware module, and the firmware module detects a level of the hardware reset signal. When the firmware module detects that the hardware reset signal has a level transition, where that the hardware reset signal has a level transition indicates that the port is executing a hot insertion event, the firmware module configures a reset clear signal for the controller and the Peripheral Component Interface express Physical Layer by using the system control register. The controller and the Peripheral Component Interface express Physical Layer stop, according to the reset clear signal, performing a reset operation. The hot swappable device establishes a service with the host.

In an embodiment of the present invention, the firmware module detects a level transition of a hardware reset signal input by the host, which indicates that the port is executing a hot insertion event, and the hot swappable device establishes a service with the host. Detection of the hot insertion event is implemented without a need of using hardware such as a notification button, thereby effectively reducing resources on a plate electrode, reducing a waiting time for hot insertion, and improving working efficiency.

A second aspect of the present invention provides a hot swappable method, where the method is applied to the hot swappable device provided in the first aspect, and the method includes: detecting, by a Peripheral Component Interface express Physical Layer, an analog signal in each of multiple lanes, and when it is detected that an amplitude of an analog signal in one of the multiple lanes is less than a preset threshold, generating, by the Peripheral Component Interface express Physical Layer, an analog signal loss indication ALOS signal corresponding to the lane;

transmitting, by the Peripheral Component Interface express Physical Layer, the ALOS signal to an interrupt masking module, generating, by the interrupt masking module, an ALOS interrupt signal corresponding to the lane, and sending, by the interrupt masking module, the ALOS interrupt signal to a firmware module; and from a time when the firmware module receives an ALOS interrupt signal corresponding to the first lane, if the firmware module receives, in a preset time period, an ALOS interrupt signal corresponding to each lane, resetting, by the firmware module, a port.

In an embodiment, when the firmware module determines that ALOS interrupt signals of all lanes corresponding to the port are received, the firmware module determines that the port is executing a hot removal event, and the firmware module performs hot removal event interrupt processing. Detection of the hot removal event is implemented without a need of using auxiliary hardware such as a notification button, thereby effectively reducing hardware resources on a plate electrode.

Optionally, the resetting, by the firmware module, a port includes: configuring, by the firmware module, a warm reset signal by using the system control register, and resetting, by a controller and the Peripheral Component Interface express Physical Layer, according to the warm reset signal.

Optionally, the ALOS interrupt signal corresponding to each lane and received by the firmware module in the preset time period instructs to hot remove the port from a host. After the configuring, by the firmware module, a warm reset signal by using the system control register, and resetting, by a controller and the Peripheral Component Interface express Physical Layer, according to the warm reset signal, the method further includes:

configuring, by the firmware module, a clear flag for the port by using the system control register, where the clear flag is used to instruct the controller to clear residual data of a service that is executed when the port is hot removed from the host.

Optionally, the method further includes: clearing, by the controller, the residual data of the service according to the clear flag, where the counter is configured to record a remaining quantity of the residual data of the service when the controller performs a clear operation; and when a count of the counter is zero, configuring, by the firmware module, a clear cancellation flag by using the system control register, where the clear cancellation flag is used to instruct the controller to stop performing the operation of clearing the data of the service.

In an embodiment, the firmware module configures a clear flag for the controller by using the system control register, so that the controller clears residual data of a service, and the firmware module may determine, according to the counter, that the residual data of the service of the port is cleared completely, so as to prevent that invalid residual data of the service may be still returned after a link is reestablished by using the port, affecting subsequent normal proceeding of the service.

Optionally, the method further includes: receiving, by the interrupt masking module, a hardware reset signal output by the host and sending the hardware reset signal to the firmware module;

receiving, by the firmware module, the hardware reset signal output by the host and detecting a level of the reset signal;

when the firmware module detects that the hardware reset signal has a level transition, configuring, by the firmware module, a reset clear signal for the controller and the Peripheral Component Interface express Physical Layer by using the system control register;

stopping, by the controller and the Peripheral Component Interface express Physical Layer according to the reset clear signal, performing a reset operation; and establishing, by the device, a service with the host.

In an embodiment of the present invention, the firmware module detects a level transition of a hardware reset signal input by the host, which indicates that the port is executing a hot insertion event, and the hot swappable device establishes a service with the host. Detection of the hot insertion event is implemented without a need of using hardware such as a notification button, thereby effectively reducing resources on a plate electrode, reducing a waiting time for hot insertion, and improving working efficiency.

DETAILED DESCRIPTION

Embodiments of the present invention provide a hot swappable device and method, so as to reduce hardware resources on a plate electrode and improve insertion and removal efficiency.

To make persons skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Currently, a peripheral component interface express (English: Peripheral Component Interface Express, PCIe for short) device is widely used, and the PCIe device supports a hot swapping function. Description is made by using an example in which a hot swappable device in the embodiments of the present invention is a PCIe device. Actually, the hot swappable device in the embodiments of the present invention may be any other device that can support the hot swapping function. The PCIe device may be a solid state drive (English: Solid State Drive, SSD for short), or may be an accelerator card.

Figure 1:
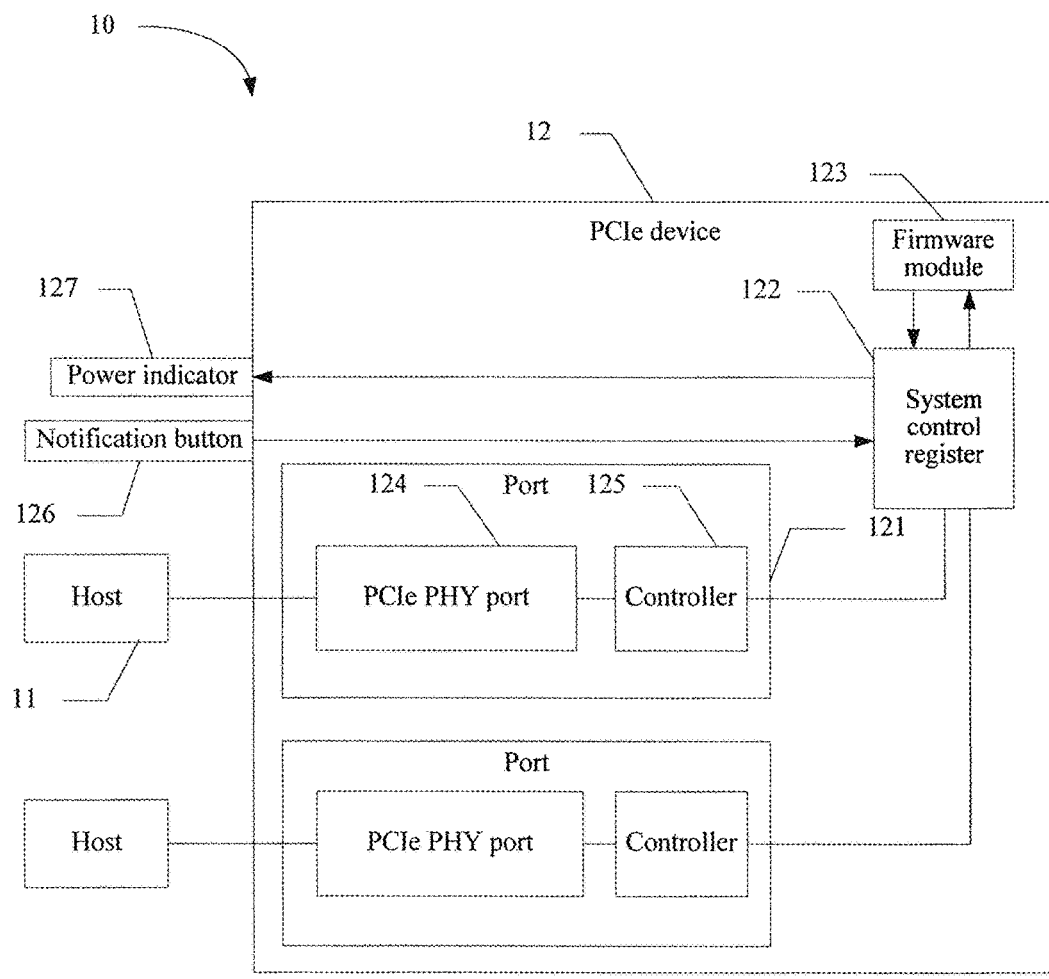
FIG. 1 is a schematic structural diagram of a hot swappable system in the prior art.
Figure 2:
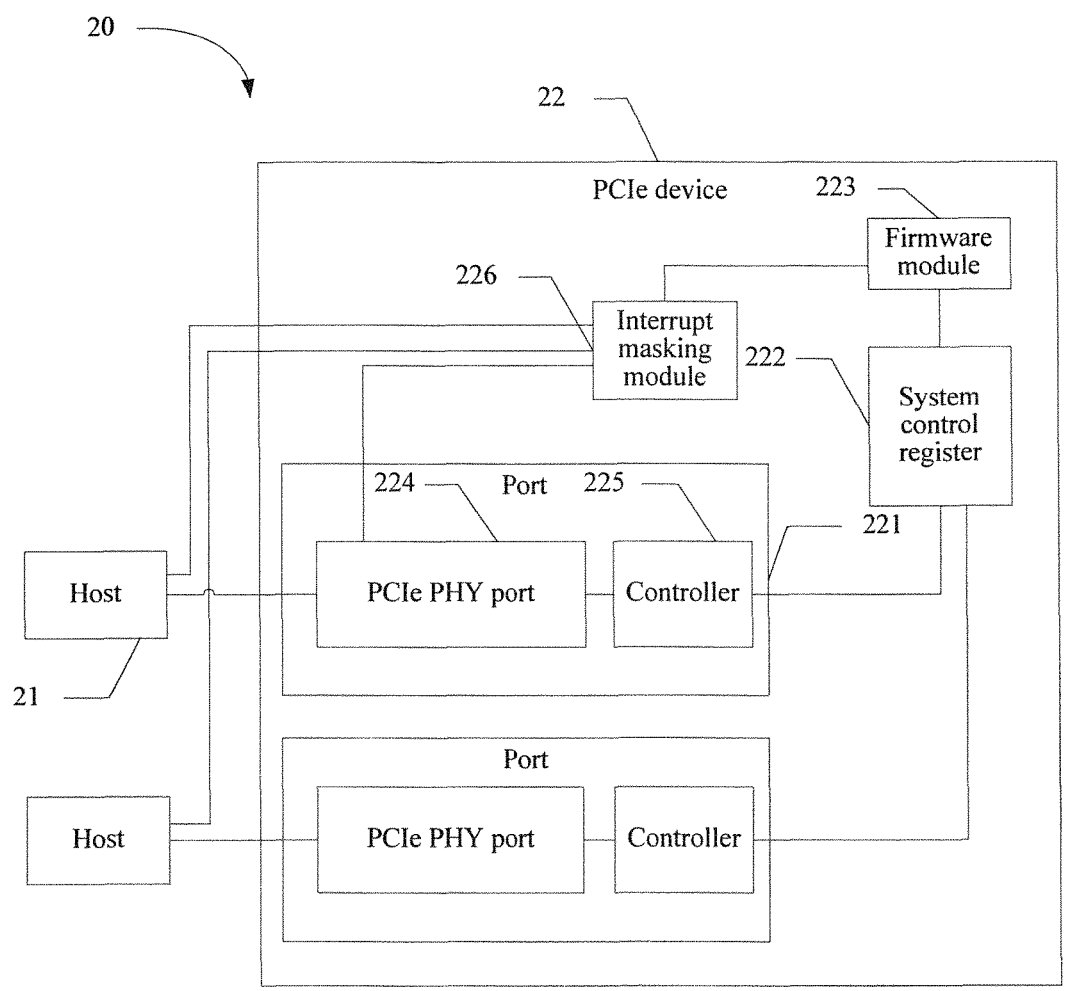
FIG. 2 is a schematic structural diagram of a hot swappable system according to an embodiment of the present invention.

FIG. 2 is a schematic structural diagram of a hot swappable system according to an embodiment of the present invention.

As shown in FIG. 2, the hot swappable system in this embodiment of the present invention includes a host 21 and a PCIe device 22. The PCIe device 22 includes multiple ports, and the PCIe device 22 may establish a communications link with multiple different hosts by using the multiple ports, so as to share resources in the PCIe device 22. The PCIe device 22 includes a port 221, a firmware module 223 (Firmware), a system control register 222, and an interrupt masking module (Mask) 226. The port 221 includes a peripheral component interface express physical layer (English: Peripheral Component Interface Express Physical Layer, PCIe PHY for short) port 224 and a controller 225.

The following provides a general description of a function of each component involved in this embodiment of the present invention.

When the host 21 and the PCIe device 22 are normally connected and have service exchange, the Peripheral Component Interface express Physical Layer 224 is configured to receive a service instruction transmitted by the external host 21. The Peripheral Component Interface express Physical Layer 224 and the controller 225 execute a related service according to the service instruction.

In this embodiment of the present invention, in a process in which the PCIe device 22 performs service exchange with the host 21, to learn in time that the PCIe device 22 is hot removed from the host 21, the Peripheral Component Interface express Physical Layer 224 periodically detects an analog signal of the port 221 at which the Peripheral Component Interface express Physical Layer 224 is located.

The Peripheral Component Interface express Physical Layer 224 is further configured to: determine, according to an amplitude of the detected analog signal, whether the analog signal is lost; and if the Peripheral Component Interface express Physical Layer 224 determines that the analog signal is lost, generate an analog signal loss (English: Analog signal loss, ALOS for short) indication signal, and send the ALOS signal to the interrupt masking module 226.

The interrupt masking module 226 is configured to generate an ALOS interrupt signal according to the ALOS signal transmitted by the Peripheral Component Interface express Physical Layer 224.

The firmware module 223 performs interrupt processing according to the received ALOS interrupt signal.

The firmware module 223 is configured to reset the port according to the ALOS interrupt signal. Actually, the ALOS interrupt signal is used to indicate a hot removal event.

In addition, the firmware module 223 is further configured to: when detecting a level transition of a hardware reset signal input by the host 21, configure a reset clear signal by using the system control register, so that the port stops performing a reset operation. The level transition of the hardware reset signal is used to indicate a hot insertion event.

Figure 3:
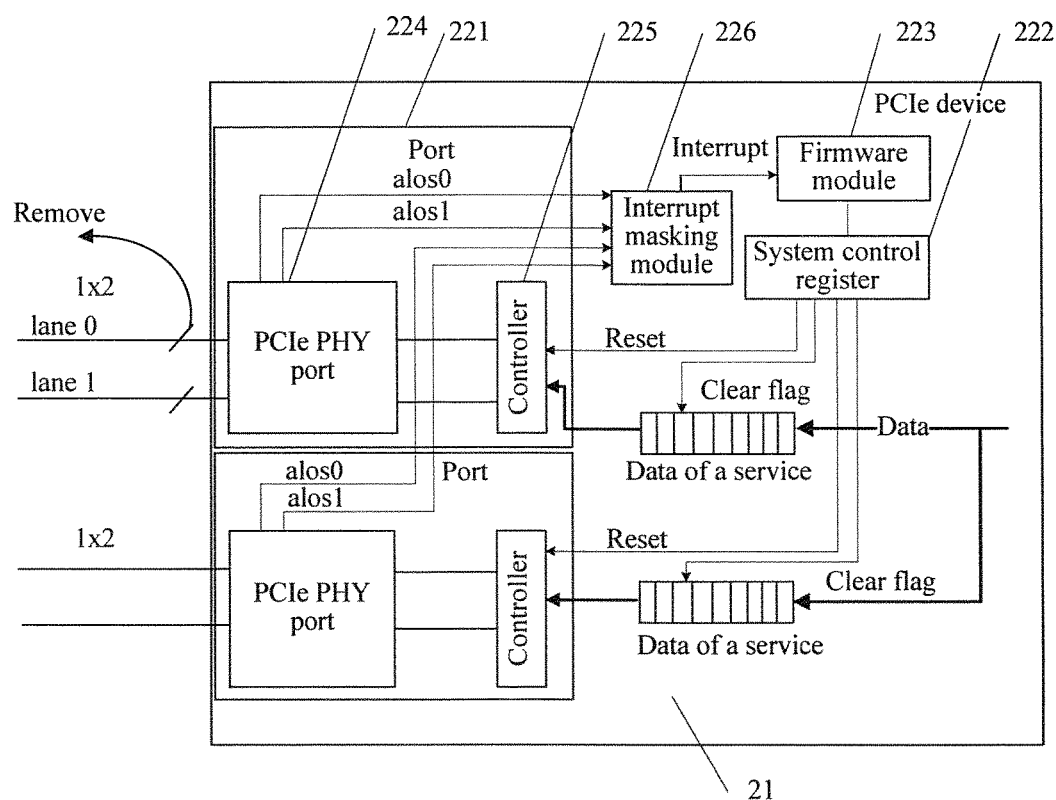
FIG. 3 is a schematic structural diagram of a hot swappable device according to an embodiment of the present invention.
Figure 4:
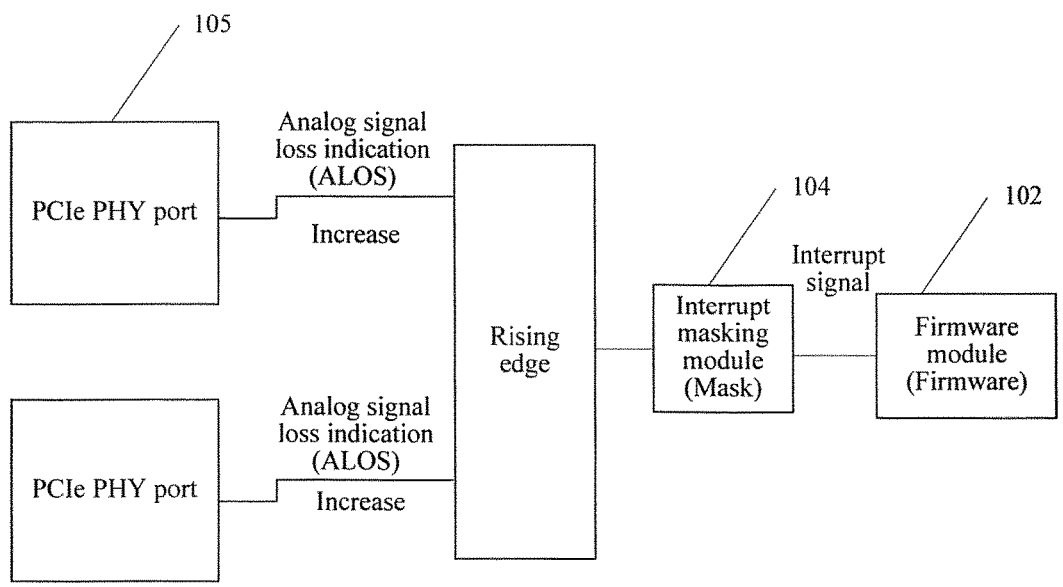
FIG. 4 is a schematic diagram of detection of hot removal according to an embodiment of the present invention.
Figure 5:
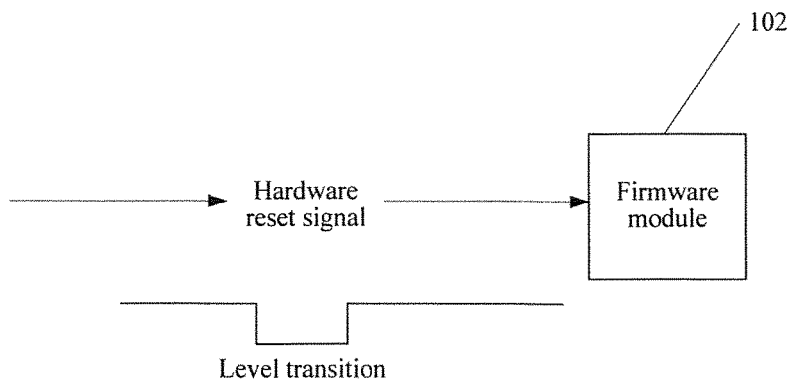
FIG. 5 is a schematic diagram of detection of hot insertion according to an embodiment of the present invention.

Specific processes in which the hot removal event and the hot insertion event are determined by the firmware module 223 may be understood with reference to descriptions of processes in FIG. 3 to FIG. 5.

The system control register 222 is configured to configure a warm reset signal to be used to reset the Peripheral Component Interface express Physical Layer 224 and the controller 225 that correspond to the port 221, and is further configured to configure a clear flag to be used to instruct the controller 225 to clear residual data of a service of the port 221.

The following describes in detail a hot removal process in this embodiment of the present invention with reference to FIG. 3 and FIG. 4, and describes in detail a hot insertion process in this embodiment of the present invention with reference to FIG. 5.

1. Detection of a Hot Removal Event

Referring to FIG. 3, an embodiment of a PCIe device in an embodiment of this application includes:

The PCIe device includes at least one port. FIG. 3 uses two ports as an example, but actually, it is not limited to the two ports shown in FIG. 3. In this embodiment of the present invention, each port includes a respective controller and Peripheral Component Interface express Physical Layer. The following uses implementation of a hot removal function of a port 221 of the two ports as an example for description.

A PCIe device 22 includes the port 221, a firmware module 223, a system control register 222, and an interrupt masking module (Mask) 226. The port 221 includes a Peripheral Component Interface express Physical Layer 224 and a controller 225. The controller 225 further includes a rate negotiation register (not shown in FIG. 3) configured to record a rate of a link.

After the PCIe device 22 is powered on completely, the firmware module 223 queries for a rate value of a current link that is recorded in a link rate register of the controller 225, and the firmware module 223 determines whether the rate value of the current link reaches a preset threshold. When the firmware module 223 determines that a highest rate value of the current link reaches the preset threshold, the firmware module 223 determines that a communications link established by the PCIe device 22 with the host 21 reaches a stable state, and the Peripheral Component Interface express Physical Layer 224 starts to detect an analog signal of the Peripheral Component Interface express Physical Layer 224. Actually, the Peripheral Component Interface express Physical Layer 224 detects an analog signal of each lane lane. The analog signal may be a differential signal. The differential signal is signals transmitted on two data lines. Amplitudes of the two signals are equal, but phases are opposite, for example, an RX+ signal and an RX− signal. The differential signal is a difference between the two signals. In a standard mode of PCIe1.0, the preset threshold may be 2.5 Gbps, in a standard mode of PCIe2.0, the preset threshold may be 5 Gbps, and in a standard mode of PCIe3.0, the preset threshold may be 8 Gbps. Certainly, the foregoing values are only examples for description, and should not be understood as a limit to the preset threshold. In this embodiment of the present invention, The Peripheral Component Interface express Physical Layer 224 includes multiple lanes lanes. An example in which the Peripheral Component Interface express Physical Layer 224 shown in FIG. 3 includes two lanes lanes is used for description. The following uses a differential signal detection process on one of the two lanes as an example for description with reference to FIG. 4. Actually, differential signal detection processes on both lanes are the same. The lane includes a pair of differential sending and receiving data lines, and the two differential sending and receiving data lines generate a differential signal. When the communications link reaches the stable state, the Peripheral Component Interface express Physical Layer 224 detects whether an amplitude of the differential signal on the lane is greater than a preset value. When detecting that the amplitude of the differential signal on the lane is greater than the preset value, the Peripheral Component Interface express Physical Layer 224 determines that the link is in a normal connection state. When detecting that the amplitude of the differential signal on the lane is less than or equal to the preset value, the Peripheral Component Interface express Physical Layer 224 determines that the differential signal on the link is lost.

When the Peripheral Component Interface express Physical Layer 224 determines that the differential signal on the lane is lost, the Peripheral Component Interface express Physical Layer 224 generates an ALOS signal corresponding to the lane, and sets the ALOS signal corresponding to the lane from a low level to a high level. The high level ALOS signal is transmitted to the interrupt masking module 226, the interrupt masking module 226 generates an ALOS interrupt signal after detecting the high level ALOS signal, and the firmware module 223 receives the ALOS interrupt signal.

The port 221 corresponds to two lanes, and each lane generates one ALOS signal. The interrupt masking module 226 generates one ALOS interrupt signal after receiving one ALOS signal. The firmware module 223 counts received ALOS interrupt signals. From a time when the firmware module 223 receives an ALOS interrupt signal corresponding to the first lane, if the firmware module 223 receives, in a preset time period, an ALOS interrupt signal corresponding to each lane, the firmware module resets the port. It may be understood that when the firmware module 223 receives two ALOS interrupt signals, the firmware module 223 determines that the port 221 currently executes a hot removal event with the external host 21, and the firmware module 223 resets the port.

When the port 221 is removed from the host 21, the PCIe device 22 may be exchanging a first service with the host 21. When the port 221 is suddenly removed from the host 21, the controller 225 and the Peripheral Component Interface express Physical Layer 224 that correspond to the port 221 may have commands related to the first service that are not executed completely, but in a case in which the link between the host 21 and the port 221 is disconnected, the controller 225 and the Peripheral Component Interface express Physical Layer 224 still continue to execute the commands and generate residual data of the first service. Because the port 221 is removed from the host 21, the generated residual data of the first service cannot continue to be returned to the host 21, and can only reside in a register of the controller 225. The residual data of the first service affects a second service after the port 221 reestablishes a communications link with the host 21, where the second service is an exchanged service after the port 221 reestablishes the communications link with the host 21.

For normal proceeding of the second service after the port 221 reestablishes the communications link with the host 21, the firmware module 223 performs a reset operation of clearing residual commands on the controller 225 and the Peripheral Component Interface express Physical Layer 224 by using the system control register 222. A specific reset manner may be that the firmware module 223 configures a warm reset signal by using the system control register 222, and the controller 225 and the Peripheral Component Interface express Physical Layer 224 clear the commands related to the first service according to the warm reset signal.

In this embodiment, the Peripheral Component Interface express Physical Layer 224 generates, by detecting a loss of a differential signal corresponding to a lane, an ALOS signal corresponding to the lane. After increasing the ALOS signal to a high level, the Peripheral Component Interface express Physical Layer 224 transmits the ALOS signal to the interrupt masking module 226. The interrupt masking module 226 generates an ALOS interrupt signal after receiving the high level ALOS signal, and sends the ALOS interrupt signal to the firmware module 223. When the firmware module 223 determines that ALOS interrupt signals of all lanes corresponding to the port 221 are received, the firmware module 223 determines that the port 221 is executing the hot removal event, and the firmware module 223 performs hot removal event interrupt processing. Detection of the hot removal event is implemented without a need of using auxiliary hardware such as a notification button, thereby effectively reducing hardware resources on a plate electrode.

Further, after the controller 225 and the Peripheral Component Interface express Physical Layer 224 reset, to ensure that the residual data of the first service does not affect the second service, the data related to the first service that resides in the register of the controller 225 needs to continue to be cleared. A specific clear manner may be that the firmware module 223 configures a clear flag (clear flag) by using the system control register 222, and the register of the controller 225 sets, according to the clear flag, a clear flag bit of the register to "1". It may be understood that, for example, a flag bit "03" of the register represents a clear flag bit, and when the register sets the clear flag bit "03" to "1", the controller 225 discards the residual data of the first service in the register, so as to prevent that after the host reestablishes the communications link with the port 221, the residual data of the first service is returned to the host 21 as data of the second service, affecting the second service.

Optionally, the controller 225 further includes a counter. The counter is configured to record a remaining quantity of the commands transmitted by the host. Each command corresponds to particular residual data. When the controller 225 performs the clear operation, the firmware module 223 may determine a remaining quantity of the residual data of the first service by using the counter, so that the firmware module 223 may determine whether the residual data of the first service of the port 221 is cleared completely. It may be understood that the first service may include multiple commands, and each command corresponds to processing data of a particular size. If the port 221 receives one command transmitted by the host 21, the counter increases by 1. After the PCIe device 22 processes one command completely and returns processing data corresponding to the command to the host 21, the counter decreases by 1. Because the port 221 is hot removed from the host 21, processing data of the related commands corresponding to the first service cannot be returned to the host, and the controller 225 clears, according to the clear flag, the processing data residing in the port 221. After the controller 225 clears data corresponding to one command, the counter decreases by 1 correspondingly. When the firmware module 223 detects that the quantity recorded by the counter is zero, the firmware module 223 determines that the residual data of the first service is cleared completely.

After the residual data of the first service of the port 221 is cleared completely, the firmware module 223 configures a clear cancellation flag for the controller 225 by using the system control register 222. The register of the controller 225 sets "the clear flag bit" to "0" according to the clear cancellation flag, and when the controller 225 determines that the clear flag bit is "0", the controller 225 does not perform the operation of clearing the data of the service any longer. It may be understood that after the port 221 reestablishes the communications link with the host 21, if the port 221 executes the second service, the controller 225 also clears the data of the second service according to the clear flag, which affects subsequent normal proceeding of the second service. Therefore, after the residual data of the first service of the port 221 is cleared completely, the controller 225 does not need to perform the operation of clearing the data of the service.

In this embodiment, the firmware module 223 configures the flag bit of the register in the controller 225 by using the system control register 222, so that the controller 225 clears the residual data of the first service that is stored in the register, and the firmware module 223 may determine, according to the counter, that the residual data of the first service of the port 221 is cleared completely, so as to prevent that invalid residual data of the first service may be still returned after the link is reestablished by using the port, affecting normal proceeding of the second service.

2. Detection of a Hot Insertion Event

Refer to a schematic diagram of detection of hot insertion shown in FIG. 5.

Based on the foregoing embodiment, after the port 221 performs hot removal completely, the PCIe device 22 may be re-inserted into the host 21 or another host to establish a communications link with the host. The port 221 also involves performing a hot insertion operation. The following describes in detail how to detect the hot insertion operation with reference to FIG. 5.

In this embodiment of the present invention, the firmware module 223 performs detection by detecting a "high-low-high" level transition of a hardware reset signal input by the host 21. The following briefly describes obtaining of the first high level in the "high-low-high" level transition.

Every time after the port 221 is inserted into the host, the host inputs a low level hardware reset signal. The low level hardware reset signal is input to the interrupt masking module 226. The firmware module 223 performs interrupt processing after receiving the low level reset signal sent by the interrupt masking module 226. The firmware module 223 enables hardware, such as the controller 225 and the Peripheral Component Interface express Physical Layer 224, corresponding to the port to perform initialization. The host may determine that hardware resetting is completed by means of preset duration. After hardware resetting is completed, the host increases the hardware reset signal to a high level, and the firmware module 223 records a level state of the hardware reset signal as a high level.

The following briefly describes obtaining of the second low level in the "high-low-high" level transition.

After the port 221 reestablishes a communications link with the host, the host inputs a low level hardware reset signal. The low level hardware reset signal is input to the interrupt masking module 226. The firmware module 223 detects the low level reset signal and records a level state of the hardware reset signal as a low level.

The following briefly describes obtaining of the third high level in the "high-low-high" level transition.

After the firmware module 223 detects the low level hardware reset signal, the firmware module 223 enables the hardware corresponding to the port 221 to perform initialization. After hardware resetting is completed, the host increases the hardware reset signal to a high level. The firmware module 223 records the level of the hardware reset signal as a high level.

When the firmware module 223 detects the "high-low-high" level transition of the signal, the firmware module 223 determines that the port 221 is executing a hot insertion event.

After the firmware module 223 determines that the port 221 executes the hot insertion event, the firmware module further needs to configure a reset clear signal by using the system control register 222. The reset clear signal is used to enable the controller 225 and the Peripheral Component Interface express Physical Layer 224 to stop performing a reset operation. It may be understood that because a hot removal operation is performed before the hot insertion, to prevent that the Peripheral Component Interface express Physical Layer 224 and the controller 225 execute residual commands related to a first service, affecting subsequent proceeding of a second service, the firmware module 223 performs a reset operation of clearing the residual commands on the controller 225 and the Peripheral Component Interface express Physical Layer 224 by using the system control register 222. However, after the port 221 currently performs hot insertion, the reset signal continues to trigger the controller 225 and the Peripheral Component Interface express Physical Layer 224 to perform the reset operation. In this way, when the port 221 exchanges the second service with the host 21, the controller 225 and the Peripheral Component Interface express Physical Layer 224 continue to perform an operation of clearing instructions related to the second service. Therefore, to ensure normal proceeding of the second service, the controller 225 and the Peripheral Component Interface express Physical Layer 224 need to stop performing the reset operation.

The foregoing describes a hot swappable device. The following describes a hot swappable method, and the method is applied to the hot swappable device corresponding to the foregoing embodiments.

1. Detection of a Hot Removal Event

With reference to a schematic structural diagram of the PCIe device shown in FIG. 3, a structure of the PCIe device is not described again in a method embodiment. The PCIe device includes at least one port. FIG. 3 uses two ports as an example, but actually, it is not limited to the two ports shown in FIG. 3. In this embodiment of the present invention, each port includes a respective controller and Peripheral Component Interface express Physical Layer. The following uses a hot removal method of a port 221 of the two ports as an example for description.

Figure 6:
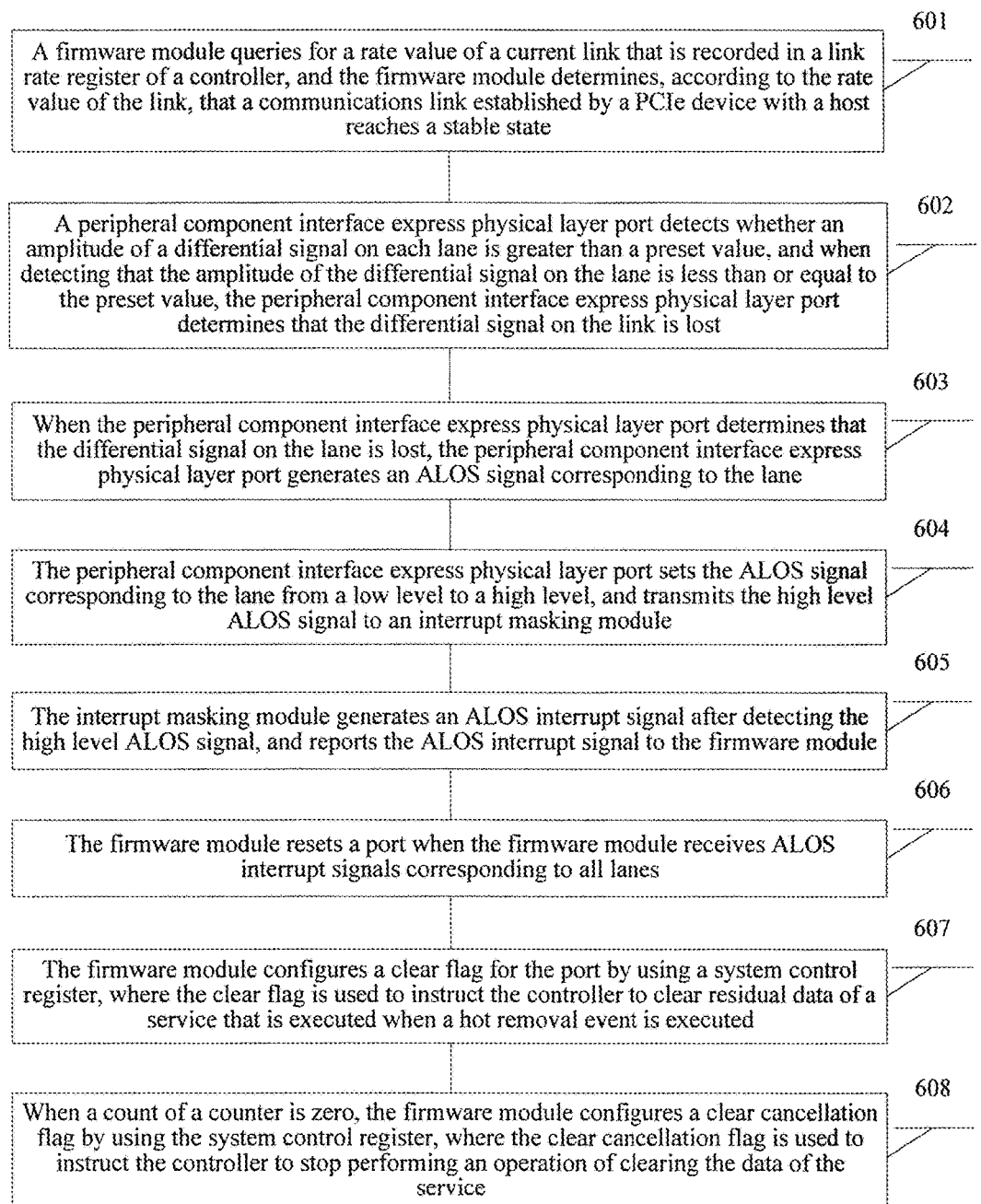
FIG. 6 is a schematic diagram of a hot removal method according to an embodiment of the present invention.

An embodiment of a method in an embodiment of this application includes:

Refer to a schematic diagram of a hot swappable method shown in FIG. 6.

Step 601: A firmware module 223 queries for a rate value of a current link that is recorded in a link rate register of a controller 225, and the firmware module 223 determines, according to the rate value of the link, that a communications link established by a PCIe device 22 with a host 21 reaches a stable state.

After the PCIe device 22 is powered on completely, the firmware module 223 queries for the rate value of the current link that is recorded in the link rate register of the controller 225, and the firmware module 223 determines whether the rate value of the current link reaches a preset threshold. When the firmware module 223 determines that a highest rate value of the current link reaches the preset threshold, the firmware module 223 determines that the communications link established by the PCIe device 22 with the host 21 reaches the stable state.

Step 602: A Peripheral Component Interface express Physical Layer 224 detects whether an amplitude of a differential signal on each lane is greater than a preset value, and when detecting that an amplitude of a differential signal on one lane is less than or equal to the preset value, the Peripheral Component Interface express Physical Layer 224 determines that the differential signal on the link is lost.

The Peripheral Component Interface express Physical Layer 224 shown in FIG. 3 includes two lanes lanes. The following uses a differential signal detection process on one of the two lanes as an example for description with reference to FIG. 4. Actually, differential signal detection processes on both lanes are the same. The lane includes a pair of differential sending and receiving data lines, and the two differential sending and receiving data lines generate a differential signal. When the communications link reaches the stable state, the Peripheral Component Interface express Physical Layer 224 detects whether an amplitude of the differential signal on the lane is greater than the preset value. When detecting that the amplitude of the differential signal on the lane is greater than the preset value, the Peripheral Component Interface express Physical Layer 224 determines that the link is in a normal connection state. When detecting that the amplitude of the differential signal on the lane is less than or equal to the preset value, the Peripheral Component Interface express Physical Layer 224 determines that the differential signal on the link is lost.

Step 603: When the Peripheral Component Interface express Physical Layer 224 determines that the differential signal on the lane is lost, the Peripheral Component Interface express Physical Layer 224 generates an ALOS signal corresponding to the lane.

Step 604: The Peripheral Component Interface express Physical Layer 224 sets the ALOS signal corresponding to the lane from a low level to a high level, and transmits the high level ALOS signal to an interrupt masking module 226.

Step 605: The interrupt masking module 226 generates an ALOS interrupt signal after detecting the high level ALOS signal, and sends the ALOS interrupt signal to the firmware module 223.

Step 606: The firmware module 223 resets the port 221 when the firmware module 223 receives ALOS interrupt signals corresponding to all lanes.

It may be understood that from a time when the firmware module 223 receives the ALOS interrupt signal corresponding to the first lane, if the firmware module receives, in a preset time period, an ALOS interrupt signal corresponding to each lane, the firmware module resets the port. It may be understood that when the firmware module 223 receives two ALOS interrupt signals, the firmware module 223 determines that the port 221 currently executes a hot removal event with the external host 21.

The firmware module 223 configures a warm reset signal by using a system control register 222, and the controller 225 and the Peripheral Component Interface express Physical Layer 224 reset according to the warm reset signal.

When the port 221 is removed from the host 21, the PCIe device 22 may be exchanging a first service with the host 21. When the port 221 is suddenly removed from the host 21, the controller 225 and the Peripheral Component Interface express Physical Layer 224 that correspond to the port 221 may have commands related to the first service that are not executed completely, but in a case in which the link between the host 21 and the port 221 is disconnected, the controller 225 and the Peripheral Component Interface express Physical Layer 224 still continue to execute the commands and generate residual data of the first service. Because the port 221 is removed from the host 21, the generated residual data of the first service cannot continue to be returned to the host 21, and can only reside in a register of the controller 225. The residual data of the first service affects a second service after the port 221 reestablishes a communications link with the host 21, where the second service is an exchanged service after the port 221 reestablishes the communications link with the host 21.

In this embodiment, when the firmware module 223 determines that ALOS interrupt signals of all lanes corresponding to the port 221 are received, the firmware module 223 determines that the port 221 is executing a hot removal event, and the firmware module 223 performs hot removal event interrupt processing. Detection of the hot removal event is implemented without a need of using auxiliary hardware such as a notification button, thereby effectively reducing hardware resources on a plate electrode.

For normal proceeding of the second service after the port 221 reestablishes the communications link with the host 21, the firmware module 223 performs a reset operation of clearing residual commands on the controller 225 and the Peripheral Component Interface express Physical Layer 224 by using the system control register 222. A specific reset manner may be that the firmware module 223 configures a warm reset signal by using the system control register 222, and the controller 225 and the Peripheral Component Interface express Physical Layer 224 clear the commands related to the first service according to the warm reset signal.

Further, step 607: The firmware module configures a clear flag for the port by using a system control register, where the clear flag is used to instruct the controller to clear residual data of a service that is executed when a hot removal event is executed.

After the controller 225 and the Peripheral Component Interface express Physical Layer 224 reset, to ensure that the residual data of the first service does not affect the second service, the data related to the first service that resides in the register of the controller 225 needs to continue to be cleared. A specific clear manner may be that the firmware module 223 configures a clear flag (clear flag) by using the system control register 222, and the register of the controller 225 sets, according to the clear flag, a clear flag bit of the register to "1". It may be understood that, for example, a flag bit "03" of the register represents a clear flag bit, and when the register sets the clear flag bit "03" to "1", the controller 225 discards the residual data of the first service in the register, so as to prevent that after the host reestablishes the communications link with the port 221, the residual data of the first service is returned to the host 21 as data of the second service, affecting the second service.

Optionally, step 608: When a count of a counter is zero, the firmware module configures a clear cancellation flag by using the system control register, where the clear cancellation flag is used to instruct the controller to stop performing an operation of clearing the data of the service.

The counter is configured to record a remaining quantity of the commands transmitted by the host. Each command corresponds to particular residual data. When the controller 225 performs the clear operation, the firmware module 223 may determine a remaining quantity of the residual data of the first service by using the counter, so that the firmware module 223 may determine whether the residual data of the first service of the port 221 is cleared completely.

After the residual data of the first service of the port 221 is cleared completely, the firmware module 223 configures a clear cancellation flag for the controller 225 by using the system control register 222. The register of the controller 225 sets "the clear flag bit" to "0" according to the clear cancellation flag, and when the controller 225 determines that the clear flag bit is "0", the controller 225 does not perform the operation of clearing the data of the service any longer. It may be understood that after the port 221 reestablishes the communications link with the host 21, if the port 221 executes the second service, the controller 225 also clears the data of the second service according to the clear flag, which affects subsequent normal proceeding of the second service. Therefore, after the residual data of the first service of the port 221 is cleared completely, the controller 225 does not need to perform the operation of clearing the data of the service.

In this embodiment, the firmware module 223 configures the flag bit of the register in the controller 225 by using the system control register 222, so that the controller 225 clears the residual data of the first service that is stored in the register, and the firmware module 223 may determine, according to the counter, that the residual data of the first service of the port 221 is cleared completely, so as to prevent that invalid residual data of the first service may be still returned after the link is reestablished by using the port, affecting normal proceeding of the second service.

2. Detection of a Hot Insertion Event

Based on the foregoing embodiment, after the port 221 performs hot removal completely, the PCIe device 22 may be re-inserted into the host 21 or another host to establish a communications link with the host. The port 221 also involves performing a hot insertion operation. The following describes in detail a method of how to detect hot insertion with reference to FIG. 5.

Figure 7:
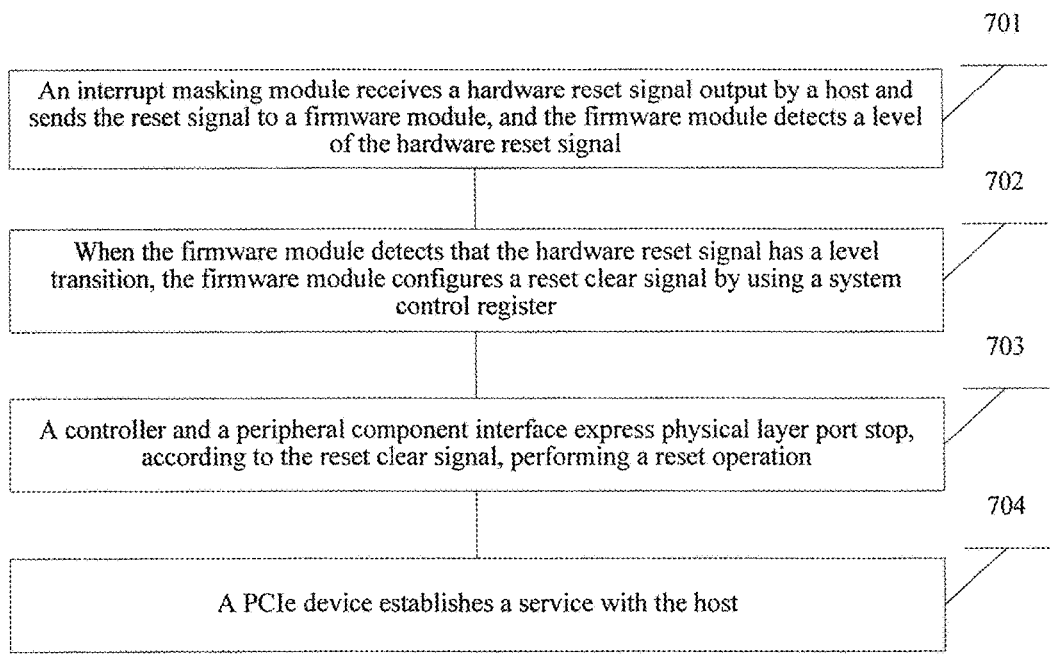
FIG. 7 is a schematic diagram of a hot insertion method according to an embodiment of the present invention.

Refer to a schematic diagram of a hot insertion method shown in FIG. 7. A hot insertion method provided in an embodiment of the present invention includes:

Step 701: An interrupt masking module receives a hardware reset signal output by a host and sends the hardware reset signal to a firmware module, and the firmware module detects a level of the reset signal.

In this embodiment of the present invention, the firmware module 223 performs detection by detecting a "high-lowhigh" level transition of the hardware reset signal input by the host 21. In this embodiment of the present invention, the firmware module 223 performs detection by detecting a "high-low-high" level transition of the hardware reset signal input by the host 21. The following briefly describes obtaining of the first high level in the "high-low-high" level transition.

Every time after the port 221 is inserted into the host, the host inputs a low level hardware reset signal. The low level hardware reset signal is input to the interrupt masking module 226. The firmware module 223 performs interrupt processing after receiving the low level reset signal sent by the interrupt masking module 226. The firmware module 223 enables hardware, such as the controller 225 and the Peripheral Component Interface express Physical Layer 224, corresponding to the port to perform initialization. The host may determine whether hardware resetting is completed by means of preset duration. After hardware resetting is completed, the host increases the hardware reset signal to a high level, and the firmware module 223 records a level state of the hardware reset signal as a high level.

The following briefly describes obtaining of the second low level in the "high-low-high" level transition.

After the port 221 reestablishes a communications link with the host, the host inputs a low level hardware reset signal. The low level hardware reset signal is input to the interrupt masking module 226. The firmware module 223 detects the low level reset signal and records a level state of the hardware reset signal as a low level.

The following briefly describes obtaining of the third high level in the "high-low-high" level transition.

After the firmware module 223 detects the low level hardware reset signal, the firmware module 223 enables the hardware corresponding to the port 221 to perform initialization. After hardware resetting is completed, the host increases the hardware reset signal to a high level. The firmware module 223 records the level of the hardware reset signal as a high level.

Step 702: When the firmware module detects that the hardware reset signal has a level transition, the firmware module configures a reset clear signal for a controller and a Peripheral Component Interface express Physical Layer by using a system control register.

It may be understood that the level transition of the hardware reset signal is used to instruct the port to execute a hot insertion event with the host.

When the firmware module 223 detects the "high-low-high" level transition of the signals, the firmware module 223 determines that the port 221 is executing a hot insertion event.

After the firmware module 223 determines that the port 221 executes the hot insertion event, the firmware module further needs to configure a reset clear signal by using the system control register 222. The reset clear signal is used to enable the controller 225 and the Peripheral Component Interface express Physical Layer 224 to stop performing a reset operation. It may be understood that because a hot removal operation is performed before the hot insertion, to prevent that the Peripheral Component Interface express Physical Layer 224 and the controller 225 execute residual commands related to a first service, affecting subsequent proceeding of a second service, the firmware module 223 performs a reset operation of clearing the residual commands on the controller 225 and the Peripheral Component Interface express Physical Layer 224 by using the system control register 222. However, after the port 221 currently performs hot insertion, the reset signal continues to trigger the controller 225 and the Peripheral Component Interface express Physical Layer 224 to perform the reset operation. In this way, when the port 221 exchanges the second service with the host 21, the controller 225 and the Peripheral Component Interface express Physical Layer 224 continue to perform an operation of clearing instructions related to the second service.

Step 703: The controller and the Peripheral Component Interface express Physical Layer stop, according to the reset clear signal, performing a reset operation.

It should be understood that to ensure subsequent normal proceeding of the second service, the controller 225 and the Peripheral Component Interface express Physical Layer 224 need to stop performing the reset operation.

Step 704: A PCIe device establishes a second service with the host.

In this embodiment of the present invention, a firmware module determines a hot insertion event by detecting a level transition of a hardware reset signal input by a host without a need of using auxiliary hardware such as a notification button and a power indicator, thereby effectively reducing resources on plate electrode, and reducing a preparation time required by a hot swappable device for performing hot insertion.

It may be clearly understood by persons skilled in the art that, for the purpose of convenient and brief description, for the foregoing method, reference may be made to a detailed working process of an apparatus in the foregoing device embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A hot swappable device, comprising:
a port;
a firmware module;
an interrupt masking module;
wherein the device is configured to be connected to a host by using the port, the port comprises a Peripheral Component Interface express Physical Layer (PCIe PHY), the PCIe PHY comprises multiple lanes, and the multiple lanes are configured to receive an analog signal from the host;
wherein the PCIe PHY is configured to:
detect an analog signal in each of the multiple lanes, and when it is detected that an amplitude of an analog signal in one of the multiple lanes is less than a preset threshold, generate an analog signal loss indication (ALOS) signal corresponding to the lane, and
transmit the ALOS signal to the interrupt masking module;
wherein the interrupt masking module is configured to:
generate an ALOS interrupt signal corresponding to the lane, and
send the ALOS interrupt signal to the firmware module; and
from a time when the firmware module receives an ALOS interrupt signal corresponding to a first lane, when the firmware module receives, in a preset time period, an ALOS interrupt signal corresponding to each lane, the firmware module is configured to reset the port.

2. The device according to claim 1, further comprising:
a system control register;
wherein the port further comprises a controller, the PCIe PHY is connected to the controller, the controller is connected to the system control register, and the system control register is connected to the firmware module; and
the firmware module is configured to configure a warm reset signal by using the system control register, and the controller and the PCIe PHY are configured to reset according to the warm reset signal.

3. The device according to claim 2, wherein the ALOS interrupt signal corresponding to each lane and received by the firmware module in the preset time period is for instructing to hot remove the port from the host; and
the firmware module is configured to configure a clear flag for the port by using the system control register for instructing the controller to clear residual data of a service that is executed when the port is hot removed from the host.

4. The device according to claim 3, wherein:
the port further comprises a counter;
the controller is configured to clear the residual data of the service according to the clear flag, and the counter is configured to record a remaining quantity of the residual data of the service when the controller performs a clear operation; and
when a count of the counter is zero, the firmware module is configured to clear a cancellation flag by using the system control register, and the controller is configured to stop, according to the clear cancellation flag, performing an operation of clearing the residual data of the service.

5. The device according to claim 3, wherein:
the interrupt masking module is configured to receive a hardware reset signal output by the host and send the hardware reset signal to the firmware module;
the firmware module is configured to detect a level of the hardware reset signal;
when the firmware module detects that the hardware reset signal has a level transition, the firmware module is configured to configure a reset clear signal for the controller and the PCIe PHY by using the system control register;
the controller and the PCIe PHY stop, according to the reset clear signal, performing a reset operation; and
the device is configured to establish a service with the host.

6. A hot swappable method, wherein the method is applied to a hot swappable device, the device comprises a port, a firmware module, and an interrupt masking module, the device is configured to be connected to a host by using the port, the port comprises a Peripheral Component Interface express Physical Layer (PCIe PHY), the PCIe PHY comprises multiple lanes, the multiple lanes are configured to receive an analog signal from the host, the method comprising:
when the device is connected to the host:
detecting an analog signal in each of the multiple lanes, and when it is detected that an amplitude of an analog signal in one of the multiple lanes is less than a preset threshold, generating, by the PCIe PHY, an analog signal loss indication (ALOS) signal corresponding to the lane;
transmitting, by the PCIe PHY, the ALOS signal to the interrupt masking module;
generating, by the interrupt masking module, an ALOS interrupt signal corresponding to the lane, and sending, by the interrupt masking module, the ALOS interrupt signal to the firmware module; and
from a time when an ALOS interrupt signal corresponding to a first lane is received, when, in a preset time period, an ALOS interrupt signal corresponding to each lane is received, resetting the port.

7. The method according to claim 6, wherein the device further comprises a system control register, the port further comprises a controller, the PCIe PHY is connected to the controller, the controller is connected to the system control register, and the system control register is connected to the firmware module; and
resetting the port comprises:
configuring a warm reset signal, and resetting the port according to the warm reset signal.

8. The method according to claim 7, wherein the ALOS interrupt signal corresponding to each lane and received in the preset time period is for instructing to hot remove the port from the host; and after configuring the warm reset signal and resetting the port according to the warm reset signal, the method further comprises:
configuring a clear flag for the port and clearing residual data of a service that is executed when the port is hot removed from the host.

9. The method according to claim 8, wherein:
the port further comprises a counter; and
the method further comprises:
clearing the residual data of the service according to the clear flag and recording a remaining quantity of the residual data of the service when the controller performs a clear operation; and
when a count of the counter is zero, configuring a clear cancellation flag for instructing the controller to stop performing the operation of clearing the service data.

10. The method according to claim 8, further comprising:
receiving a hardware reset signal output by the host and detecting a level of the reset signal;
when the hardware reset signal has a level transition, configuring a reset clear signal;
stopping, according to the reset clear signal, performing a reset operation; and
establishing, by the device, a service with the host.

11. A hot swappable method, wherein the method is applied to a hot swappable device, the device comprises a port, the device is configured to be connected to a host by using the port, the port comprises multiple lanes, the multiple lanes are configured to receive an analog signal from the host, the method comprising:
when the device is connected to the host:
detecting an analog signal in each of the multiple lanes, and when it is detected that an amplitude of an analog signal in one of the multiple lanes is less than a preset threshold, generating an analog signal loss indication (ALOS) signal corresponding to the lane; and
based on the ALOS signal, when it is detected that in a preset time period an amplitude of an analog signal in each of the multiple lanes drops below the preset threshold, resetting the port.

12. The method according to claim 11, wherein resetting the port comprises:
configuring a warm reset signal, and resetting the port according to the warm reset signal.

13. The method according to claim 12, wherein after resetting the port, the method further comprises:
configuring a clear flag for the port and clearing residual data of a service that is executed when the port is hot removed from the host.

14. The method according to claim 13, further comprising:
clearing the residual data of the service according to the clear flag, and recording a remaining quantity of the residual data of the service when a clear operation is performed; and
configuring a clear cancellation flag for stopping performance of the clear operation.

15. The method according to claim 13, further comprising:
receiving a hardware reset signal output by the host and detecting a level of the hardware reset signal;
when the hardware reset signal has a level transition, configuring a reset clear signal;
stopping, according to the reset clear signal, performance of a reset operation; and
establishing, by the device, a service with the host.

* * * * *